United States Patent [19]

Fujita et al.

[11] Patent Number: 4,518,665

[45] Date of Patent: May 21, 1985

[54] SHEET-SHAPED POLYMER SECONDARY BATTERY OF LAYER BUILT TYPE

[75] Inventors: Kazunori Fujita, Ibaraki; Shigeoki Nishimura, Katsuta; Hiroyuki Sugimoto; Noboru Ebato, both of Hitachi; Shinpei Matsuda, Ibaraki, all of Japan

[73] Assignees: Hitachi, Ltd.; Showa Denko K.K., both of Tokyo, Japan

[21] Appl. No.: 544,118

[22] Filed: Oct. 20, 1983

[30] Foreign Application Priority Data

Oct. 20, 1982 [JP] Japan ................................ 57-182776

[51] Int. Cl.$^3$ ............................................. H01M 4/60
[52] U.S. Cl. ................................... 429/153; 429/213; 429/134
[58] Field of Search ............... 429/213, 212, 252, 149, 429/134, 152, 153, 127, 124; 204/291

[56] References Cited

U.S. PATENT DOCUMENTS 4,078,935  3/1978  Nakagiri et al. .................... 428/328
4,321,114  3/1982  MacDiarmid et al. ............. 429/213

Primary Examiner—Anthony Skapars

Attorney, Agent, or Firm—Antonelli, Terry & Wands

[57] ABSTRACT

The present invention provides a sheet-shaped polymer secondary battery of layer built type which is a laminate of plurality of sheet-shaped unit cells each of which comprising the following elements (a) to (c):

(a) a positive electrode made of a film-shaped polymer having conjugated double bonds and provided with a thin metal layer at one side of the surface of the film and capable of reversibly doping and undoping negative ions, (b) a negative electrode made of a film-shaped polymer having conjugated double bonds and provided with a thin metal layer at one side of the surface of the film and capable of reversibly doping and undoping positive ions, and (c) an insulating porous separator supporting a dopant-containing electrolyte and existing between the positive electrode and the negative electrode.

By the use of the sheet-shaped polymer secondary battery of layer built type according to the present invention, the current-collecting efficiency can be enhanced and also the charging-discharging efficiency can be increased.

14 Claims, 3 Drawing Figures

NUMBER OF CHARGING-DISCHARGING CYCLES

SHEET-SHAPED POLYMER SECONDARY BATTERY OF LAYER BUILT TYPE

BACKGROUND OF THE INVENTION

1. Field of the Invention

The present invention relates to a sheet-shaped secondary battery of layer built type using polymers such as a polyacetylene as the electrodes.

2. Prior Arts

Recently, batteries using polymers having conjugated double bonds such as a polyacetylene as the electrodes are drawing attention, since they have high energy densities, and thus can be used as one of the starting materials for making batteries of small size and light weight. Such a battery is described, for example, in Japanese Patent Application Kokai (Laid-open) No. 56-136469/1981.

The present inventors have made extensive studies for developing a sheet-shaped battery which is flexible and usable even when flexed and has excellent durability as a secondary battery. As a result of the studies, it was found that the polymers having conjugated double bonds such as a polyacetylene have excellent flexing resistance and can preferably be used in sheet-shaped secondary batteries. It was also found out from the studies by the present inventors that, when a plurality of unit cells, each of which uses said polymers, is laminated to form a layer built type battery, even if either one of two electrodes is provised with a thin metal layer, this battery functions fundamentally as such, but does not exhibit with a sufficient charging-discharging characteristic and this is due to that current-collecting action is not properly done in the battery.

SUMMARY OF THE INVENTION

Object of the Invention

An object of the present invention is to provide a sheet-shaped secondary battery of layer built type usable even when under a flexed condition.

Another object of the present invention is to provide a sheet-shaped secondary battery of layer built type whose characteristic would not be reduced even when the battery is used under a flexed condition.

Outline of the Invention

The sheet-shaped polymer secondary battery of layer built type according to the present invention is characterized by being a laminate of a plurality of sheet-shaped unit cells, each of which comprises the following elements (a) to (c):

(a) a positive electrode made of a film-shaped polymer having conjugated double bonds and provided with a thin metal layer at one side of the surface of the positive electrodes and capable of reversibly doping and undoping negative ions, (b) a negative electrode made of a film-shaped polymer having conjugated double bonds and provided with a thin metal layer at one side of the surface of the negative electrode and capable of reversibly doping and undoping positive ions, and (c) an insulating porous separator supporting a dopant-containing electrolyte and existing between the positive electrode and the negative electrode.

BRIEF DESCRIPTION OF THE DRAWINGS

The present invention will be explained by referring to the accompanying drawings. FIG. 1 is a fragmentary sectional view showing a structure of a battery which is one of the embodiments of the present invention. Numeral 1 is the positive electrodes, and 2 is the negative electrodes. These electrodes independently are a film-shaped polymer having conjugated double bonds. For the positive electrodes, the said polymer capable of reversibly doping and undoping negative ions is used. For the negative electrodes, the said polymer capable of reversibly doping and undoping positive ions is used. Numerals 3a and 3b independently are a thin metal layer provided at one side of the surface of the positive electrode. Numerals 4a and 4b independently are a thin metal layer provided at one side of the surface of the negative electrode. These thin metal layers independently are, for examples, a vapor-deposited metal film. Numeral 5 is a separator supporting an electrolyte. One of the features of the present invention lies in the above thin metal layers. That is, when unit cells are laminated to form a layer built type battery, fundamentally the battery functions as such by placing either of the thin metal layers 3a and 4a or by placing a thin metal layer (not shown in FIG. 1) between the positive electrode and the negative electrode which are adjacent to each other. However, as described above, the present inventors found out that both cases have a problems in current-collecting efficiency, consequently both of the adjacent thin metal layers 3a and 4a are necessary. Based on this finding, the present invention has been accomplished. Particularly, when the thin metal layers attached to the positive electrodes or to the negative electrodes are a vapor-deposited metal film, the current-collecting action is done very effectively. Numeral 5 is an insulating porous separator supporting a dopant-containing electrolyte. Numeral 6 is a battery support. Numeral 7 is a battery case.

Another feature of the present invention is to use film-shaped polymer having conjugated double bonds such as a polyacetylene for both the positive electrodes and the negative electrodes. The present inventors found out that this is requisite in order to satisfy flexing resistance required for a sheet-shaped secondary battery of layer built type.

For the positive electrodes 1 and the negative electrodes 2, besides the aforementioned polyacetylene, there can be used a polyparaphenylene, a polypyrrole, a poly-2,5-thienylene, etc.

For the thin metal layers 3a, 3b, 4a and 4b, a vapor-deposited metal film is preferable.

For the dopant and a solvent therefor, known substances can be used. For the dopant, there can be used, for example, ions giving a p-type electroconductive conjugated high molecular weight compound such as $Cl^-$, $Br^-$, $ClO_4^-$, $PF_6^-$, $AsF_4^-$, $AsF_6^-$, $CF_6SO_3^-$, $BF_4^-$ and the like, as well as ions type electroconductive conjugated high molecular weight compound such as $Li^+$, $Na^+$, $K^+$, $R_4N^+$, (wherein R is a hydrocarbon group of 1 to 20 carbon atoms) and the like. For the solvent, there can be used, for example, one compound selected from the group consisting of tetrahydrofuran, dioxane, γ-butylolactone, dimethoxyethane, prolylene carbonate, acetonitrile, dimethylformamide, dimethyl sulfoxide, sulforan, ethylene carbonate and the like, or a mixture of these two or more. In the present invention, the electrolyte can be used in the form of paste or a solid state.

For the separator, there are used, for example, a glass fiber, an alumina fiber, a potassium titanate fiber, a porous film of a synthetic resin such as a polyethylene or a polypropylene, a natural fiber, etc. The present inventors found out that it is effective for the separator to support an adsorbent powder for adsorbing moisture present or decomposition products which may be formed from the electrochemical reactions in the battery. By allowing the separator to support an adsorbent powder, coulombic efficiency in charging-discharging can be enhanced and a battery life can be extended. For the adsorbent powder, there can be used at least one member selected from the group consisting of inorganic adsorbent [such as porous alumina, silica, aluminosilicate compounds (molecular sieve) and the like] and organic synthetic resin [such as a styrene-divinylbenzene crosslinked gel, an acrylic resin and the like] and activated carbon, etc.

Figure 2:
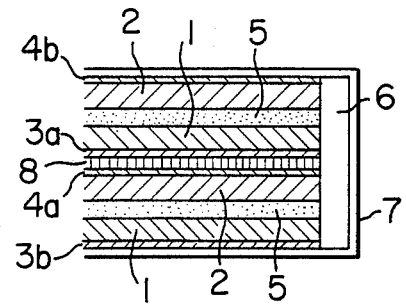

The present inventors further found out that placing an electrolyte-impermeable metal foil 8 between two adjacent unit cells, namely, two adjacent thin metal layers 3a and 4a as shown in FIG. 2, is effective, and by placing this metal foil 8, permeation of an electrolyte through the two adjacent cells as well as reduction of battery characteristics can be prevented, and these effects are particularly striking when the thin metal layers 3a and 4a are a vapor-deposited metal film.

In the present invention, when unit cells are laminated, they can be electrically connected in series, in parallel or in combination thereof.

In the present invention, in order to prevent the penetration of oxygen or moisture from outside, a shielding layer made from an inorganic insulating substance or the like may be provided between a battery main body and a battery case. Also, the thin metal layer 3b and 4b shown in FIGS. 1 and 2 may be thicker to make them more impermeable to oxygen and moisture. Further, the battery case may be sealed.

EXAMPLE 1

Figure 1:
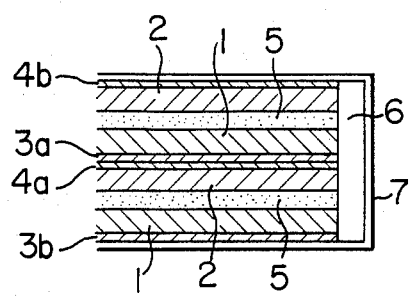
FIGS. 1 and 2 independently are a fragmentary sectional view showing a structure of a sheet-shaped polymer secondary battery of layer built type according to one of the embodiments of the present invention.

For the positive electrodes and the negative electrodes there were used a polyacetylene sheet having a specific gravity of 0.91, a thickness of 236 $\mu$m and an area of 4 cm$^2$ having a vapor-deposited metal film of 300 Å thickness formed on one side of the surface of the film by the use of a sputtering apparatus. For the supported electrolyte, there was used a solution of 0.5 mol/liter of tetraethylammonium perchlorate [$(C_2H_5)_4NClO_4$] (which is an electrolyte and at the same time is a dopant) dissolved in acetonitrile (being purified by distillation and dehydrated). For the separator, there was used a polypropylene unwoven cloth supporting alumina ("$Al_2O_3$ W200 Neutral" manufactured by M. Woelm Eschwege A. G.) and having a total thickness of 650 $\mu$m. This separator was impregnated with the above mentioned supported electrolyte. Using these materials, a sheet-shaped polymer secondary battery of layer built type as shown in FIG. 1 was prepared. In this battery, the thin metal layers 3a and 4a attached to the respective polyacetylene films shown in FIG. 1 had direct contact.

Figure 3:
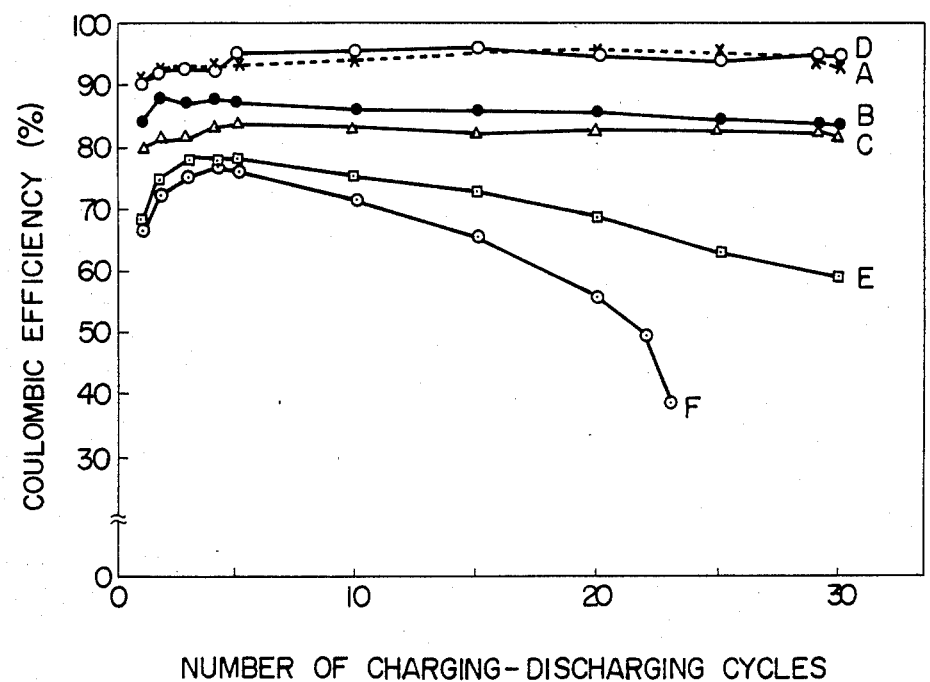
FIG. 3 is a curve showing relationship between charging-discharging cycle and efficiency.

This battery was charged for 30 minutes at a current density of 5 mA/cm$^2$ and then discharged at a current density of 5 mA/cm$^2$ until the battry voltage dropped to 2 V, a coulombic efficiency (percentage of quantity of electricity discharged to quantity of electricity charged) in each charging cycles was measured. The relationship between the number of cycles and the coulombic efficiency when a charging-discharging cycle was repeated 30 times is shown as the curve A in FIG. 3. The coulombic efficiency at 30th cycle was 92% and the after-change voltage at that time was 5.5 V.

EXAMPLE 2

A sheet-shaped polymer secondary battery of layer built type was prepared, which has the same structure as in the battery of Example 1, except that for a separator there was used polypropylene unwoven cloth supporting silica ground to 200 mesh ("Silbead N" manufactured by Mizusawa Kagaku Kogyo Co., Ltd) and having a total thickness of 600 $\mu$m. A charging-discharging test was conducted in the same condition as in Example 1. The result is shown in as curve B in FIG.

The coulombic efficiency at 30th cycle was 83% and the after-charge voltage at that time was 6.1 V.

EXAMPLE 3

A sheet-shaped polymer secondary battery of layer built type was prepared which has the same structure as in the battery of Example 1 except that for a separator there was used a polyproplene unwoven cloth supporting a styrene-divinylbenzene crosslinked gel ("XAD-2", ground to 200 mesh manufactured by Rohm and Haas Co.) and having a total thickness of 750 $\mu$m. A charging-discharging test was conducted in the same condition as in Example 1. The result is shown as curve C in FIG. 3.

The coulombic efficiency at 30th cycle was 81% and the after-charge voltage at that time was 6.2 V.

EXAMPLE 4

By using positive electrodes, negative electrodes, a supported electrolyte and a separator which were the same as those used in Example 1, a sheet-shaped polymer secondary battery of layer built type having the structure as shown in FIG. 2 was prepared. The same charging-discharging test as in Example 1 was conducted. The result is shown as curve D in FIG. 3. In FIG. 2, as the metal foil 8, SUS 304 having 50 $\mu$m in thickness was used. The coulombic efficiency at 30th cycle was 94% and the after-voltage at that time was 5.6 V.

Comparative Example 1

Using one piece of polyacetylene sheet having no vapor-deposited metal film and three peices of polyacetylene sheets each having a vapor-deposited metal film which are the same as those used in Example 1 and also using a supported electrolyte and a separator both of which are the same as those used in Example 1, a sheet-shaped polymer secondary of layer built type was prepared. That is, a battery which is a battery of FIG. 1 without having the vapor-deposited metal film 3a was prepared.

A charging-discharging test was conducted in the same condition as in Example 1. The result is shown as curve E in FIG. 3.

The coulombic efficiency at 30th cycle was 58% and the after-charge voltage at that time was 6.8 V.

Comparative Example 2

A sheet-shaped polymer secondary battery of layer built type was prepared which is the same as the battery of Comparative Example 1, except that for a separator a laminated polypropylene unwoven cloth having 600 μm thickness was used. The same charging-discharging test as in Example 1 was conducted. The result is shown as curve F in FIG. 3.

The current efficiency began to sharply decrease at 20th cycle and the after-charge voltage at that time exceeded 7.4 V.

Advantages of the Invention

As is obvious from the above Examples and Comparative Examples, when a film-shaped polymer having conjugated double bonds such as a polyacetylene is provided with a vapor-deposited metal film at one side of the surface of the film, and this integrated sheet is laminated in a plural number, when two of these metal films are allowed to have a tight contact with each other and current is collected, advantages are obtained that current-collecting efficiency can be enhanced, current efficiency in charging-discharging can be improved and a battery life can also be extended. The present invention is also advantageous in that it can provided flexing resistance which is requisite for sheet-shaped secondary batteries of layer built type.

What is claimed is:

1. A sheet-shaped polymer secondary battery of layer built type characterized by being a laminate of a plurality of sheet-shaped unit cells, each of which comprises the following elements (a) to (c):
   (a) a positive electrode made of a film-shaped polymer having conjugated double bonds and provided with a thin metal layer at one side of the surface of the film-shaped polymer and capable of reversibly doping and undoping negative ions,
   (b) a negative electrode meade of a film-shaped polymer having conjugated double bonds and provided with a thin metal layer at one side of the surface of the film-shaped polymer and capable of reversibly doping and undoping positive ions, and
   (c) an insulating porous separator supporting a dopant-containing electrolyte and existing between the positive electrode and the negative electrode so as to be adjacent a side of each of the positive and negative electrodes not having said thin metal layer thereon, and wherein adjacent unit cells of the plurality of unit cells are laminated such that the thin metal layer at the one side of the surface of the positive electrode of one unit cell contacts the thin metal layer at the one side of the surface of the negative electrode of the adjacent unit cell.

2. A sheet-shaped polymer secondary battery of layer built type according to claim 1, wherein the film-shaped polymer consisting of the positive electrode and the negative electrode is a polyacetylene.

3. A sheet-shaped polymer secondary battery of layer built type according to claim 1 or 2, wherein the separator has adsorptivity.

4. A sheet-shaped polymer secondary battery of layer built type according to claim 3, wherein the separator is a fibrous base material supporting an adsorbent powder.

5. A sheet-shaped polymer secondary battery of layer built type according to claim 4, wherein the adsorbent powder is an inorganic or organic compound.

6. A sheet-shaped polymer secondary battery of layer built type characterized in that it is formed by laminating a plurality of sheet-shaped unit cells, each of which comprises the following elements (a) to (c), with an electrolyte-impermeable metal film placed between each of two adjacent unit cells:
   (a) a positive electrode made of a film-shaped polymer having conjugated double bonds provided with a thin metal film at one side of the surface of the film-shaped polymer and capable of reversibly doping and undoping negative ions,
   (b) a negative electrode made of film-shaped polymer having conjugated double bonds and provided with a thin metal film at one side of the surface of the film-shaped polymer and capable of reversibly doping and undoping positive ions, and
   (c) an insulating porous separator supporting a dopant-containing electrolyte and existing between the positive and the negative electrode so as to be adjacent a side of each of the positive and negative electrodes not having said thin metal film thereon, and wherein adjacent unit cells of said plurality of sheet-shaped unit cells are laminated such that each said electrolyte-impermeable metal film is provided between and adjacent to said thin metal film of the positive electrode of one unit cell and said thin metal film of the negative electrode of the adjacent unit cell.

7. A sheet-shaped polymer secondary battery of layer built type according to claim 6, wherein each said electrolyte-impermeable metal film is provided in contact with said thin metal film of the positive electrode of the one unit cell and in contact with said thin metal film of the negative electrode of the adjacent unit cell.

8. A sheet-shaped polymer secondary battery of layer built type according to claim 6 or 7, wherein the thin metal films of the positive and negative electrodes of the unit cells are vapor-deposited metal films.

9. A sheet-shaped polymer secondary battery of layer built type according to claim 1, wherein the thin metal layers of the positive and negative electrodes of the unit cells are vapor-deposited metal films.

10. A sheet-shaped polymer secondary battery of layer built type according to claim 6, wherein the separator has adsorptivity.

11. A sheet-shaped polymer secondary battery of layer built type according to claim 10, wherein the separator is a fibrous base material supporting an adsorbent powder.

12. A sheet-shaped polymer secondary battery of layer built type according to claim 11, wherein said adsorbent powder is made of a material selected from the group consisting of porous alumina, silica, aluminosilicate compound, styrene-divinylbenzene crosslinked gel, acrylic resin, and activated carbon.

13. A sheet-shaped polymer secondary battery of layer built type according to claim 4, wherein said adsorbent powder is made of a material selected from the group consisting of porous alumina, silica, aluminosilicate compound, styrenedivinylbenzene crosslinked gel, acrylic resin, and activated carbon.

14. A sheet-shaped polymer secondary battery of layer built type according to claim 1 or 6, further including a battery case having enclosed therein said plurality of sheet-shaped unit cells, and further including a shielding layer, surrounding the plurality of sheet-shaped unit cells and between the plurality of unit cells and the battery case, for preventing penetration of oxygen or moisture into the plurality of unit cells.

* * * * *